Feb. 24, 1970   W. H. HORTON ET AL   3,497,863
SOCKET STRUCTURE FOR MULTILAMP PHOTOFLASH UNIT
Filed Jan. 8, 1968   2 Sheets-Sheet 1
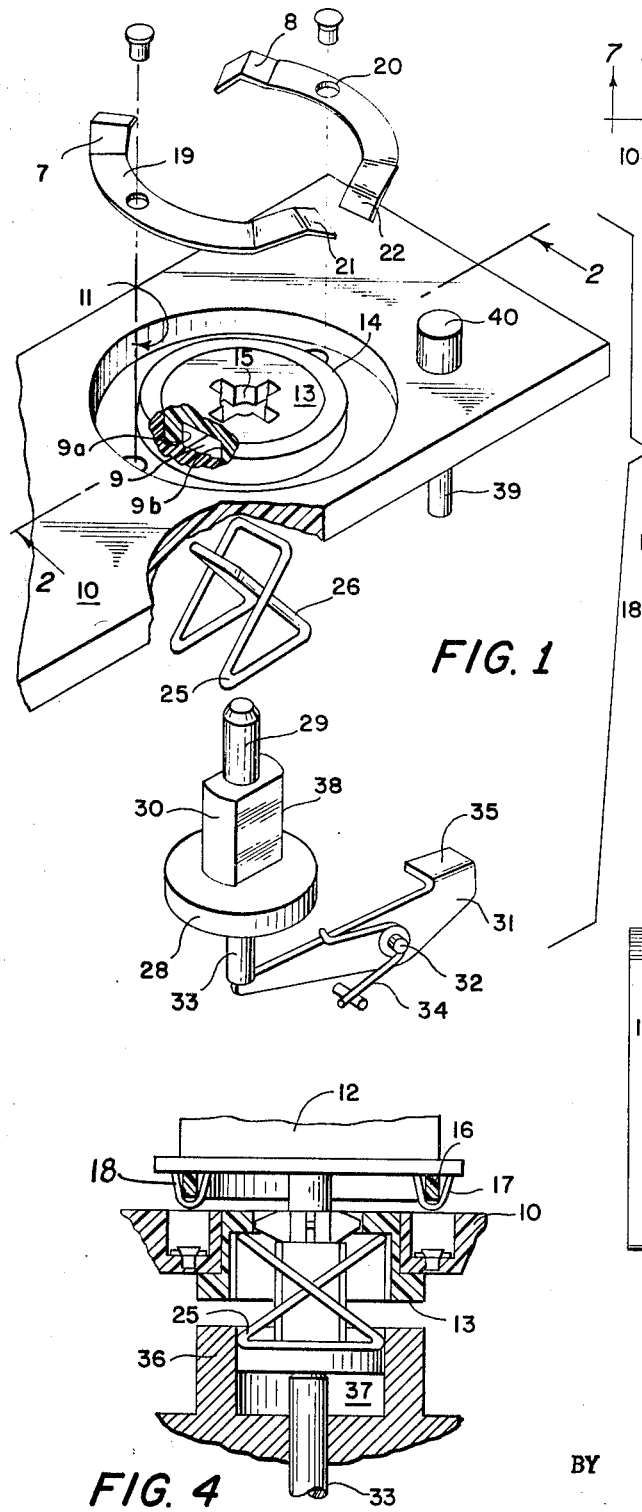
FIG. 1
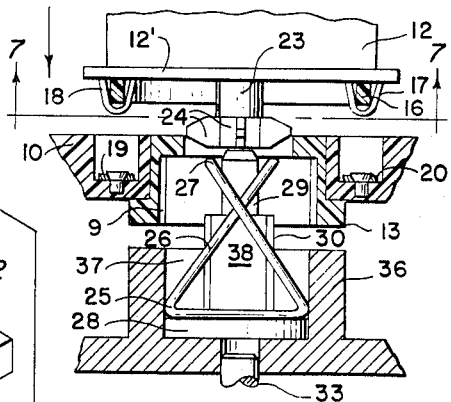
FIG. 2
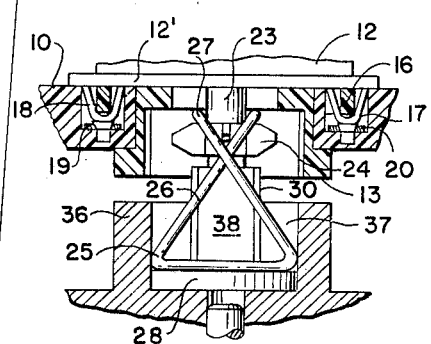
FIG. 3
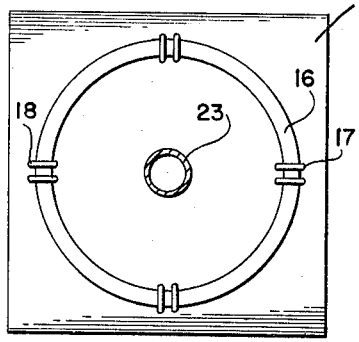
FIG. 4
FIG. 7
INVENTORS
WILLIAM H. HORTON
EDWARD L. STURM
CHESTER W. MICHATEK
LEON C. SHEKELL
BY
Ronald S/Cowler
Robert W Hampton
ATTORNEYS

INVENTORS
WILLIAM H. HORTON
EDWARD L. STURM
CHESTER W. MICHATEK
LEON C. SHEKELL

BY

ATTORNEYS

United States Patent Office 3,497,863
Patented Feb. 24, 1970

3,497,863
SOCKET STRUCTURE FOR MULTILAMP PHOTOFLASH UNIT
William H. Horton, Edward L. Sturm, Chester W. Michatek, and Leon C. Shekell, Rochester, N.Y., assignors to Eastman Kodak Company, Rochester, N.Y., a corporation of New Jersey
Continuation-in-part of application Ser. No. 474,394, July 23, 1965. This application Jan. 8, 1968, Ser. No. 696,173
Int. Cl. H01r *13/62*
U.S. Cl. 339—45    12 Claims

ABSTRACT OF THE DISCLOSURE

A socket structure for photographic apparatus, such as a camera, to receive and retain a multilamp photoflash unit for rotation of the unit to successively place the lamps of the unit in a flash circuit, the structure including a positive release mechanism which engages the unit and permits removal of the unit only after the mechanism has been actuated.

CROSS-REFERENCE TO RELATED APPLICATIONS

Reference is made to commonly assigned copending U.S. patent application Ser. No. 474,394, filed July 23, 1965, now abandoned of which the instant application is a continuation.

BACKGROUND OF THE INVENTION

Field of the invention

The present invention relates to photographic apparatus and more particularly to a socket structure in which a multilamp photoflash unit is positively locked and rotatably retained and from which such unit can be removed only by actuating ejector means.

Description of the prior art

A disposable multilamp photoflash unit or package, such as that with which the invention is associated, is disclosed in U.S. Patent No. 3,319,548, entitled "Multilamp Flash Photography," issued May 16, 1967 in the name of F. D. Kottler. Under certain environmental conditions, with the prior art devices, it was possible for the disposable multilamp photoflash unit to become inadvertently dislodged.

SUMMARY OF THE INVENTION

The present socket structure is addressed to a miniaturized photoflash unit having means for positively holding the unit and resilient means for rotatably retaining the same in the socket, whereby the unit can only be released for withdrawal or ejection upon actuation of separate ejector means.

One object of the present invention, therefore, is the provision of a socket for providing a positive lock for retaining a multilamp photoflash unit.

Another object of the invention is to provide a socket structure for receiving a multilamp photoflash unit whereby removal of the unit can only be accomplished by actuation of a separate ejector means.

Still another object of the invention is to provide a resilient locking member in a socket structure which permits a multilamp photoflash unit to be easily inserted into the socket but which requires actuation of a separate ejector means for moving the resilient member into a position in which the unit can be removed or ejected.

BRIEF DESCRIPTION OF THE DRAWINGS

These and other objects and advantages of the present invention will be more fully understood by reference to the following detailed description when read in conjunction with the attached drawings, wherein like reference numerals indicate like elements, and wherein:

FIG. 1 is an exploded perspective view of a socket structure embodying a preferred form of the invention;

FIG. 2 is a partial vertical sectional view of the preferred embodiment shown in FIG. 1, taken on line 2—2, showing the relationship of various elements prior to the insertion of the photoflash unit;

FIG. 3 is a view similar to FIG. 2 with a photoflash unit fully inserted into the socket;

FIG. 4 is a view that is similar to FIG. 2 showing the parts in a position into which they have been moved by an ejector means for releasing the photoflash unit;

FIG. 7 is a bottom view of a photoflash unit taken along line 7—7 of FIG. 2.

DESCRIPTION OF THE PREFERRED EMBODIMENT

Figure 5:
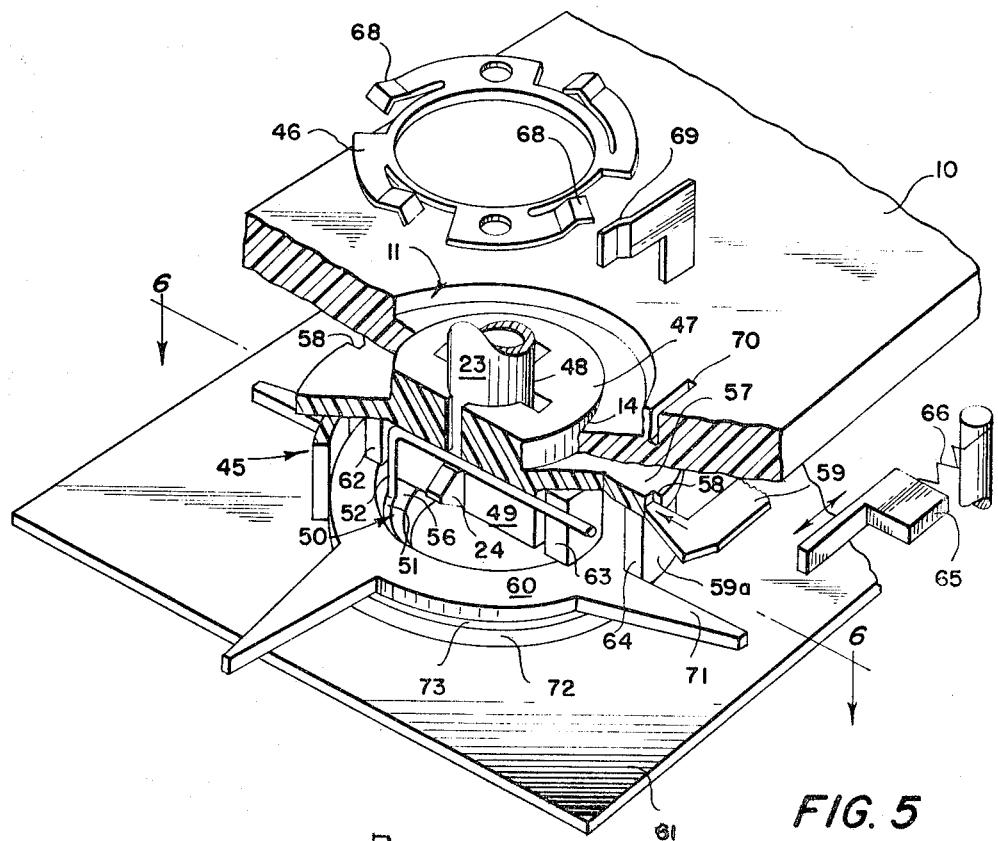
FIG. 5 is a partially exploded perspective view showing another embodiment of the socket structure.

The preferred embodiment of the invention, as shown in FIGS. 1–4 of the drawings, comprises a support plate 10 of electrical insulation material and having a circular aperture 14 in which a socket structure to be described hereinafter is rotatably arranged for receiving a multilamp flash unit 12 as disclosed in the U.S. patent to Kottler cited supra. A rotatable sleeve 13, also of electrical insulation material, is arranged in aperture 14 and is provided with a central aperture 15 having radially extending slots as shown in FIG. 1. In the bottom portion thereof, sleeve 13 is also provided with a lateral channel 9 having straight side walls 9a and 9b and curved end walls (not shown). The channel 9 is adapted to receive the upper portion of resilient member 25, to be described hereinafter.

As shown in FIG. 7, the photoflash unit 12 is provided with a base 12′ having an extending annular ring 16 over which plural pairs of spaced wire contacts designated as 17, 18 are arranged at equiangular intervals, each pair of such contacts being connected to a respective one of the flash lamps arranged within the unit.

A set of electrically energizable contact members 19 and 20 is secured in a circular recess 11 which surrounds and is substantially concentric with the circular aperture 14 in plate 10. The contact members are provided with spring ends 7, 8, 21 and 22 which are compressible by the annular ring 16 when a photoflash unit 12 is fully received by the socket structure. Spring ends 21, 22 are spaced so as to engage a pair of contacts 17, 18 that are connected to a flash lamp that has been moved into a predetermined position for energization. Thus, when a potential difference is applied across contact members 19, 20, the flash lamp connected to the contacts 17, 18 (which bridge the gap between the contact members 19, 20 and thereby complete the flash circuit) is energized. Because the spacing between spring ends 7 and 8 is greater than the spacing between wire contacts 17, 18, no more than one flashbulb is energizable for any given position of unit 12: i.e., when one pair of contacts 17, 18 is engaged with spring ends 21, 22 thereby completing the electric circuit through one flashbulb, the wire contacts comprising the other pairs are subject to the same electric potential, for example, by virtue of the fact that both wires of a given pair may be in contact with a surface (19 or 20) having but one potential at any given time.

The photoflash unit 12 has a hollow center post 23. Lugs 24 extend from center post 23 in a radial direction, the lugs being four in number and equiangularly spaced about post 23. A member 36 which is fixedly mounted within the camera body and is arranged below plate 10, is provided with a circular recess 37 in which a spindle 30 is slidably mounted. The spindle 30 comprises a circular flange 28, and intermediate portion 38 having flat side walls and curved end portions and a stem 29, the latter adapted to engage the central aperture in the end of post 23 of photoflash unit 12. There is provided a spring 25 comprising a pair of parallel horizontally extending upper arms 27 and integrally formed pairs of crossed leg members 26 with a connecting bottom member for each pair of legs 26. The spring 25 is arranged such that parallel arms 27 are slidably engaged in channel 9 of sleeve 13 and one pair of crossed leg members 26 is disposed on each side of spindle 30 along the flat portions 38, the bottom members of spring 25 being seated on flange 28. Parallel arms 27 are positioned in channel 9 such that they are in the path of a pair of opposed lugs 24 when a unit 12 is positioned relative to the aperture 15 for entry of post 23 into the socket. The configuration of the spring 25 is best shown in FIG. 1, wherein the legs 26 are shown as being crossed so that the pressure exerted against the spring at either the top or bottom will cause the legs 26 to move in a direction such that the distance between the crossed bars 27 is increased.

A release means comprises a lever 31 that is pivotally mounted on stud 32 which is fixed to the camera body structure (not shown) supporting the socket assembly. One end of the lever is in engagement with a slidable pin 33 that is journaled in member 36, as shown in FIG. 2. The lever 31 is biased in a counter-clockwise direction by a spring 34 on stud 32 and has an extension 35 that lies in the path of the end 39 of the release button 40.

With reference to FIG. 2, it will be noted that the cross bars 27 of spring 25 are arranged close to the aperture 15 in sleeve 13. When a flash unit is to be positioned in the socket, each of the lugs 24 is aligned with one of the slots extending radially from aperture 15. The unit is then moved toward sleeve 13 and each of two opposing lugs 24 engage a cross arm 27 to force it outwardly to a position in which it rides over the end of the lug and finally comes to rest in engagement with the lug on the flat surface 6 adjacent post 23, the stem 29 having entered the hole in post 23. The unit 12 is then in a position such as that shown in FIG. 3 with one pair of contacts 17, 18 in engagement with the spring ends 21, 22 (not shown) of contacts 19, 20 to provide a circuit connection, for example, with the flash circuit of the camera which is completed upon making an exposure. When unit 12 is secured in its operating position by arms 27, as shown in FIG. 3, the annular ring 16 is drawn into recess 11 to such an extent that the spring ends 7, 8, 21, 22 are compressed. Due to the position of the arms 27 relative to lugs 24, any attempt that is made to remove the unit 12 by pulling it out of the socket only results in the unit 12 being positively retained by spring 25 in that such a force urges arms 27 toward each other rather than to separate them.

Disengagement of unit 12 is produced by simply depressing button 40. By doing so, the lever 31 is moved against pin 33 which, in turn, engages flange 28 so as to move it in an upward direction against the bottom of spring 25. It should be noted that a space must be provided between the top of spindle 30 and the bottom of post 23 so as to permit a sliding action of flange 28 toward unit 12. This action, as seen in FIG. 4, causes the arms 27 to move away from each other and into a position in which they are entirely free of lugs 24. This allows the resilient ends of contacts 19, 20, which were compressed when the unit 12 was inserted into the socket, to eject the unit from the socket.

From the foregoing description it can be readily appreciated that the spring 25 provides resilient means for readily accepting a flash unit which is positively locked in the socket thereby, which though locked can be rotated, and which cannot be removed from the socket without first depressing button 40.

To produce a rotational movement of unit 12 in recess 11, the unit 12 may be grasped and manually turned or the spindle 30 can be rotated by means not shown. In the latter case, rotation of spindle 30 causes spring 25, with which the spindle is engaged, to rotate, thereby imparting a rotational movement to post 23 by the interlocking of lugs 24 with the spring arms 27. Sleeve 13 is also caused to rotate due to the engagement of arms 27 in channel 9; thus, arms 27 are maintained in a fixed position relative to aperture 15 thereby assuring proper orientation of lugs 24 under arms 27 at all times.

Figure 6:
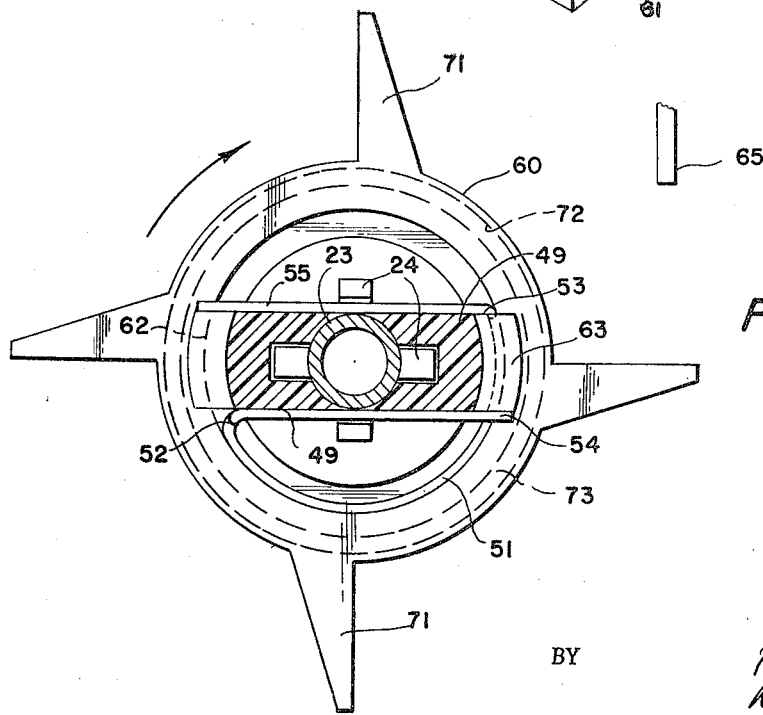
FIG. 6 is a sectional view of the embodiment shown in FIG. 5, taken on line 6—6, showing particularly the relationship of the resilient member to the sleeve, the ring member and the ejector means.

Another embodiment of the invention is shown in FIGS. 5 and 6 wherein a release means 45 is rotatable with the flash unit so that the latter can be ejected at any time. As in the description relating to the embodiment described above, a plate 10 of electrical insulation material is provided with an aperture 14 surrounded by an annular recess 11 in which a contact ring 46 of the shape shown in FIG. 5 is mounted for engaging one of the contacts 17, 18 of flash unit 12 when the latter is positioned relative thereto. A sleeve 47, also of electrical insulation material, is rotatably mounted in aperture 14, the sleeve being provided with a central aperture 48 having radially extending slots for receiving the lugs 24 of a flash unit 12. As shown in FIG. 5, the bottom portion of sleeve 47 is provided with opposed flats 49 of such an extent that an opposed pair of lugs 24 extend through their respective radial slots and are partially exposed when a unit 12 is fully inserted into the socket. Sleeve 47 is further provided with a flange 57 having four equiangularly spaced slots 58 formed in the periphery thereof. Depending from flange 57 are four spaced lugs 64, two such lugs being shown in FIG. 5. Pawl 59 which is pivotally mounted on plate 10 and spring biased toward flange 57, is adapted to engage the slots 58 as sleeve 47 rotates, thereby indexing sleeve 47 every 90 degrees of rotation. Surface 59a of pawl 59 is cammed so as to allow only a counter-clockwise rotation of sleeve 47 in aperture 14 subsequent to indexing.

Plate 61, arranged below plate 10, supports ejector ring 60 by means of an annular groove 72 formed in the surface of plate 61 which is adapted to receive the annular shoulder 73 projecting from the bottom surface of the ejector ring. The ring is provided with an inner flange portion 56 and a pair of diametrically opposed upright lugs 62, 63. A release member 65 is slidably mounted on plate 61 and retained in a withdrawn position by spring 66.

Spring 50 comprises a substantially circular base portion 51 which is seated on inner flange 56 of ejector ring 60, and has the ends thereof formed into upper extensions 52, 53 and then in opposed directions to form a pair of spaced chordal arms 54, 55 which are in a plane spaced from and parallel to that of base portion 51. The free end of arm 54 abuts the side of lug 63 on ring 60 and the free end of arm 55 abuts the side of lug 62 on ring 60. The arms 54, 55 engage the pair of lugs 24 of the post 23 of the photoflash unit that extend outside of the flat portion 49 as seen in FIG. 5.

As in the previously described embodiment, a photoflash unit 12 is arranged with respect to aperture 48 so that the lugs 24 are aligned with the slots for insertion into the socket. As the lugs are moved downwardly along the slots a pair of the lugs will engage the arms 54, 55 of spring 50 and cam the arms outwardly to a position in which they can return to engage the lugs to hold the photoflash unit in the socket. Upon being inserted into the socket and upon each rotation of the photoflash unit 12 by rotating sleeve 47 in a counterclockwise direction so as to position another one of the lamps in a flash position, one of the contacts 17 will be in engagement with a contact 68 on ring 46 and the other contact 18 will be in engagement with the fixed contact 69 held in slot 70 in plate 10. Also, upon a counter-clockwise rotational movement of sleeve 47, the engagement between the flat portions 49 and arms 54, 55 urge a rotational movement of spring 50. As spring 50 rotates, the end portions of arms 54, 55 impart the rotation of sleeve 47 to ring 60 through engagement with lugs 62 and 63 so as to position one of the radially extending arms 71 on said ring in the path of movement of the release member 65.

In order to remove the flash unit 12 the member 65 is moved in the direction of the arrow, as shown in FIG. 5, and engages the arm 71 previously positioned in its path, thereby rotating the ring 60 in a direction opposed to that in which it is moved by sleeve 47. With such rotation of ring 60, the engagement of lugs 62, 63 with the free ends of arms 54, 55 of the spring 50 spread the arms apart and into a position in which they are disengaged from a pair of lugs 24. During the photoflash unit removal procedure, sleeve 47 is prevented from rotating with the ejector ring by means of the engagement of pawl 59 with slot 58. After removal of photoflash unit 12, the free ends of arms 54, 55 tend to spring back to their rest positions. The arms 54, 55 urge a rotation of ejector ring 60 in a direction opposed to that to which it was moved during ejection. To assure that this rotation of the ejector ring, during the spring-back action of the spring arms 54, 55, ceases at substantially the same instant at which the arms attain the rest position, stop means 64 are provided. The stop means comprises a plurality of lugs which depend from flange 57 to such an extent as to be in the path of rotation of radially extending arms 71 when the ejector ring is rotated by the spring-back action of arms 54, 55.

The invention has been described in detail with particular reference to preferred embodiments thereof, but it will be understood that variations and modifications can be effected within the spirit and scope of the invention as described hereinabove.

We claim:

1. A socket structure for receiving a flash unit, said unit having a plurality of photoflash lamps mounted on a base, said socket structure comprising:
   a support plate provided with an aperture;
   base receiving means including a rotatable sleeve mounted in said aperture and provided with a central opening through which at least a portion of said base can be inserted;
   resilient means arranged in said base receiving means for engaging said base to retain the unit for rotation with said sleeve, said resilient means being rotatable with said sleeve and comprising:
      a spring member having a pair of spaced parallel arms arranged parallel to said support plate and engageable with said base to lock the base in said base receiving means,
      a base support member for supporting said spaced parallel arms, said base support member being spaced from and parallel to the plane of said arms, and
      means interconnecting said arms to said base support member;
   actuataable disengaging means for disengaging said resilient means from said base in response to actuation of said disengaging means thereby permitting removal of said unit from said base receiving means.

2. A socket structure in accordance with claim 1 wherein said base receiving means further comprises a stabilizing spindle aligned with said opening in said sleeve for engaging said base.

3. A socket structure according to claim 1 wherein said support plate aperture is surrounded by an annular recess for receiving at least one resilient electrical contact member, said contact member being compressed by said base when the latter is engaged with said resilient retaining member and thereby acts to at least partially eject said flash unit subsequent to actuation of said disengaging means.

4. A socket structure according to claim 3 wherein said base support member is substantially semicircular in shape.

5. A socket structure according to claim 3 wherein said means interconnecting said arms with said base member comprises at least one pair of crossed supporting legs arranged perpendicular to said spaced, parallel arms.

6. A socket structure in accordance with claim 2 wherein said resilient means is arranged between a flange on said stabilizing spindle and said sleeve, and said disengaging means comprises a member movable into engagement with said flange to move said spindle in an axial direction toward said sleeve thereby urging said resilient means into a position from which said base may be disengaged.

7. A socket structure for receiving a flash unit having a plurality of photoflash lamps mounted on a base, comprising:
   a supporting plate provided with an aperture and having an annular groove surrounding said aperture;
   at least one resilient electrical contact member positioned in said groove;
   socket means, rotatable with respect to said supporting plate, including a sleeve mounted in said aperture and provided with a central opening through which a first portion of said base can be inserted;
   resilient means rotatable with said socket means for lockingly engaging said first portion so as to retain said inserted unit in said socket means with a second portion of said base in stressing engagement with said resilient electrical contact member; and
   means for disengaging said resilient means from said first portion for at least partially ejecting said unit from said socket means by said contact member.

8. A socket structure in accordance with claim 7 wherein said resilient means comprises a spring that is shaped for engaging said first portion as said unit is moved in a direction to insert said first and second portions into said socket means and for preventing movement of said unit in an opposite direction.

9. A socket structure in accordance with claim 7 wherein said socket means further comprises a spindle aligned with said opening for engaging and stabilizing said first portion when inserted in said opening.

10. A socket structure in accordance with claim 9 wherein said resilient means is arranged between a flange on said stabilizing spindle and said sleeve, and said disengaging means comprises a member movable into engagement with said flange for moving said spindle in an axial direction, thereby urging said resilient means into a position from which said unit may be removed from said socket means.

11. A socket structure for receiving a rotatable flash unit having a plurality of photoflash lamps mounted on a base with a depending connecting post and a plurality of radially extending lugs, comprising:
   a supporting plate provided with an aperture;
   rotatable socket means including a sleeve mounted in said aperture and provided with a central opening through which said post and lugs can be inserted;
   a resilient member, arranged to rotate with said socket means, including a substantially semicircular base portion and a pair of parallel chordal arms, each of said arms having at least one free end and arranged in a plane spaced from and parallel to that of said base portion and connected thereto by extensions thereof, said chordal arms lockingly engaging a pair of lugs on the post of said unit to retain the latter;
   a ring member arranged in said socket means and including a plurality of radially extending actuating arms corresponding in number to said lamps and a pair of diametrically opposed drive lugs, said drive lugs being engaged by said chordal arms for moving said ring member in one direction as said unit is rotated in said same direction; and actuatable release means arranged adjacent said socket means and including an actuating member movable into engagement with one of said actuation arms positioned in the path of movement of said actuating member, whereby said ring member is moved in a direction opposed to said one direction for moving said drive lugs into engagement with the free ends of said chordal arms for spreading said chordal arms, thereby permitting removal of said unit from said socket means.

12. A socket structure in accordance with claim 11 wherein said support plate aperture is surrounded by an annular recess for receiving at least one resilient electrical contact member, said contact member being compressed by the base of said unit when the lugs of said post are engaged with said chordal arms and acting to at least partially eject said unit subsequent to actuation of said release means.

References Cited

UNITED STATES PATENTS

| | | | |
|---|---|---|---|
| 1,638,321 | 8/1927 | Burmister | 24—211 |
| 2,843,832 | 7/1958 | Bretthauer | 339—91 |
| 3,353,465 | 11/1967 | Peterson et al. | 240—37 X |
| 3,353,468 | 11/1967 | Beach | 95—11.5 |

RICHARD E. MOORE, Primary Examiner

P. A. CLIFFORD, Assistant Examiner

U.S. Cl. X.R.

95—11.5; 240—1.3